US006667087B2

(12) United States Patent
Yeh et al.

(10) Patent No.: US 6,667,087 B2
(45) Date of Patent: Dec. 23, 2003

(54) OPTICAL INFORMATION RECORDING MEDIUM

(75) Inventors: Sue-Min Yeh, Banchiau (TW);
Kao-Ming Chang, Tainan (TW);
Wen-Pin Chiu, Shindian (TW);
Lii-Chyuan Tsai, Hsinchu (TW)

(73) Assignee: CMC Magnetics Corporation (TW)

( * ) Notice: Subject to any disclaimer, the term of this patent is extended or adjusted under 35 U.S.C. 154(b) by 42 days.

(21) Appl. No.: 09/996,800

(22) Filed: Nov. 30, 2001

(65) Prior Publication Data

US 2003/0157290 A1 Aug. 21, 2003

(51) Int. Cl.⁷ .................................. B32B 3/02
(52) U.S. Cl. ................ 428/64.1; 428/64.8; 430/270.18; 430/270.19; 430/270.2
(58) Field of Search ............... 428/64.1, 64.4, 428/64.8, 913; 430/270.14, 270.18, 270.19, 270.2, 495.1, 945

(56) References Cited

U.S. PATENT DOCUMENTS 5,976,658 A  * 11/1999 Tomizawa ................. 428/64.1
6,291,045 B1 *  9/2001 Tajima ...................... 428/64.1
6,413,607 B1 *  7/2002 Kasada ..................... 428/64.1

* cited by examiner

Primary Examiner—Elizabeth Mulvaney
(74) Attorney, Agent, or Firm—Rabin & Berdo, PC

(57) ABSTRACT

An optical information recording medium with a recording layer enables a recording and reproducing to be effected with a 650 nm (or further) laser beam, and the recording layer contains at least one kind of the trimethine-cyanine dye which is a compound represented by the following general formula [1], [2], [3], [4].

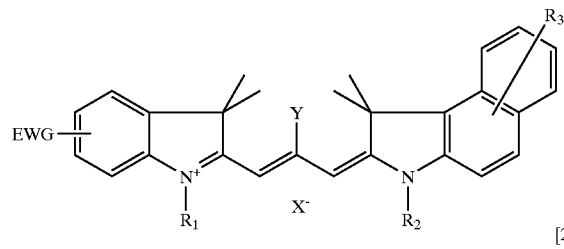

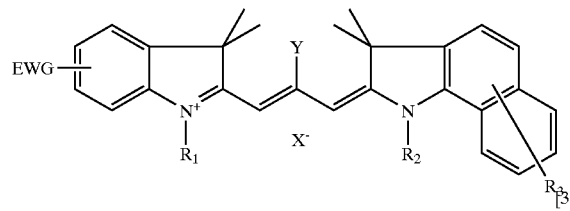

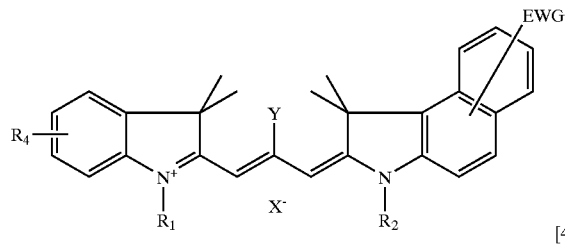

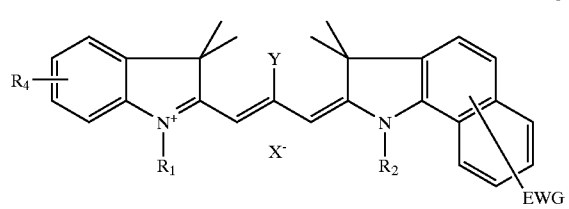

The "EWG" represents any electron-withdrawing substituted group such as cyano or nitro group.

8 Claims, No Drawings

OPTICAL INFORMATION RECORDING MEDIUM

BACKGROUND OF THE INVENTION

1. Field of the Invention

This invention relates to an optical recording medium, particularly to an optical information recording medium for recording layer comprising at least one asymmetric trimethine-cyanine dye with electron-withdrawing substituted group.

2. Description of the Related Art

An optical recording medium capable of once recording by a laser ray has been known. For the structure of the CD-R information recording medium, a recording layer comprising an organic dye, a reflection layer and a protective layer are laminated on a transparent substrate by order. The recording information on the disc is performed by irradiating a laser at a wavelength of 780 nm to 830 nm to cause exothermic deformation of the recording layer. The information is usually reproduced by the same wavelength of laser ray, and the reflecting difference between the recorded area and unrecorded area is detected for the recording layer.

It is known that a laser ray with a shorter wavelength has a reduced light spot. Therefore, studies have being made to develop the optical disc capable of recording and reproducing by a laser beam of a wavelength of 620 nm to 690 nm to increase the recording density. Recordable digital video (DVD-R), which is capable of recording and reading in high density, is propagated as new media of the next generation. Since the wavelength zone for performing the recording and reproducing in DVD-R differs from that of the CD-R, the criteria for selecting the recording material to be employed for the CD-R cannot be applied to the DVD-R. Hence, new selection criteria are required to be established from a viewpoint peculiar to the DVD-R.

Trimethine-based cyanine dye is popular for DVD-R recording layer. U.S. Pat. No. 5,976,658 and U.S. Pat. No. 6,291,045 described the use of trimethine-based cyanine dye having symmetry or asymmetry indolenine structure for DVD-R. In U.S. Pat. No. 6,291,045, the absorbance ratio of the second peak to the main peak for the recording layer is disclosed to be less than 0.8 by using a visible ultraviolet spectrometer. However, the dye material should be selected carefully, while the writing wavelength of laser beam of DVD-R machines is changed from 635 nm to 650 nm (or further). Because the wavelength of laser power is getting longer, the dye absorbance of film state for 650 nm should be increased a little more. The dye, which is suitable for writing wavelength of 635 nm laser beam, is not performed well while the writing wavelength of laser beam is 650 nm. We suggest that the maximum absorption wavelength of the material with solution is in the range of 575 nm to 590 nm.

SUMMARY OF THE INVENTION

The first object of the present invention is to provide an optical information recording medium with a recording layer, which comprises at least one asymmetric trimethine-cyanine dye with electron-withdrawing substituted group.

The second object of the present invention is to provide asymmetric trimethine-cyanine dye with a counter anion, which improves the solubility of the asymmetric trimethine-cyanine dye in the coating solvent.

The third object of the present invention is to provide an optical information recording medium with improved write/read characteristics at the writing wavelength of 650 nm or further.

The invention provides an optical recording material With the structure represented by the formula [1], [2], [3], [4].

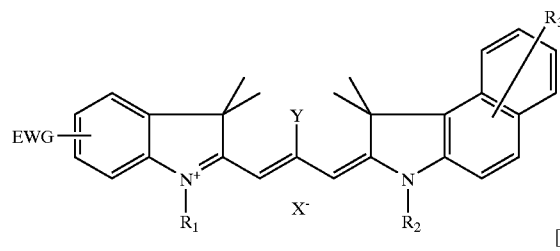

[1]

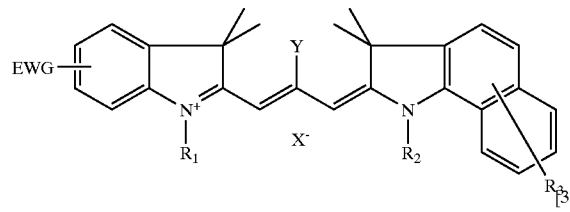

[2]

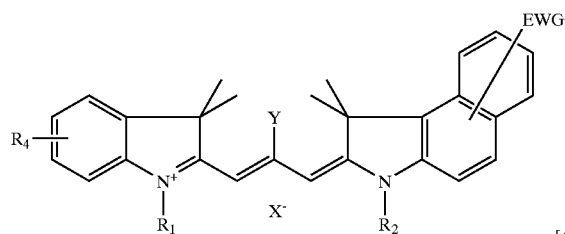

[3]

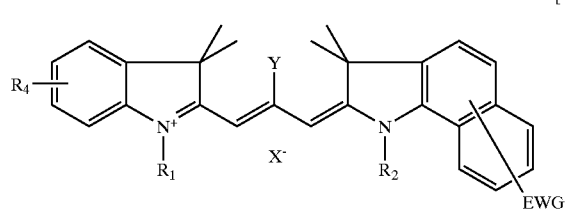

[4]

The "EWG" represents any electron-withdrawing substituted group such as a cyano, or a nitro group. The "$R_1$" and "$R_2$" are the same or different from each other and each is one of an individually substituted or unsubstituted alkyl, phenyl, benzyl, alkylphenyl and phenoxyalkyl group. The "$R_3$" and "$R_4$" are the same or different from each other and each is a are hydrogen atom, halogen atom, alkoxy, hydroxyl and alkyl group. The "Y" is a halogen atom or an alkyl group, and "$X^-$" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and alkylcarboxylate. The material has a maximum absorption wavelength from 575 nm to 590 nm in acetonitrile solution. It is used as a recording material for DVD-R machine with the laser wavelength from 620 nm to 690 nm.

The material used in the dye layer also selectively comprises the trimethine-cyanine dye of formula [5].

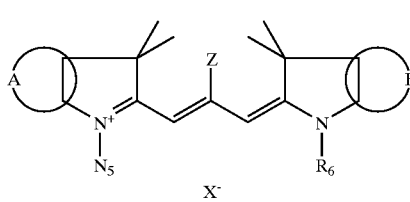

[5]

The "A" and "B" represent any one of the following formulas [6], [7], [8], [9].

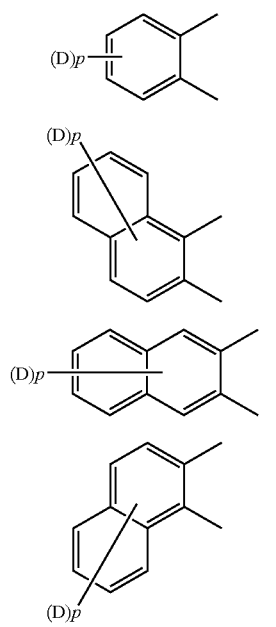

The "A" and "B" may be the same or different from each other. The "D" may be substituted or unsubstituted alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl which are bonded to a metallic ion or alkyl, phenyl, benzyl, alkylphenyl or phenoxyalkyl group. The "p" represents an integral or more.

The "$R_5$" and "$R_6$" may be the same or different from each other and are individually substituted or unsubstituted alkyl, phenyl, benzyl, alkylphenyl or phenoxyalkyl group. The "Z" is hydrogen atom, halogen atom or alkyl group, and "$X^-$"is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate, akylcarboxylate.

The manufacture of the optical information recording medium according to this invention can be performed as follows.

(1) A solution contains a cyanine dye represented by general formula [1], [2], [3], [4] or a solution contains a cyanine dye represented by general formula [1], [2], [3], [4] mixed with the dye of formula [5], which is less than 100% by weight. The solution prepared above may be added in some kind of singlet oxygen quencher such as a metal complex, a light absorbent, a radical scavenger, etc. The solvent used in the dye solution may be selected from fluorinated alcohol, diaceton alcohol, methylethyl ketone, methanol, toluene, cyclohexanone, acetylacetone, dioxane. The mixing ratio of the cyanine dye should be 0.5% to 50% by weight.

(2) The material for the substrate may be employed by glass, epoxy resin, methacryl resin, polycarbonate, polyester resin, polyvinyl chloride resin, polyolefin resin. The substrate may be provided with tracking grooves or pits.

(3) The dye solution is provided on a substrate by means of a spin-coating method.

(4) The optical information recording medium may further include a reflection layer in addition to the recording layer. The reflection layer, a film of high reflectivity, can be formed by the vapor-deposition or sputtering a metal, such as Gold, Aluminum, Silver, Cupper, Platinum or alloy.

(5) The reflection layer may be provided with protective layer. It is formed for the purpose of protecting or improving the optical information recording medium, and can be formed by coating a solution of a radiation cure type resin on a given surface and then by radiation-curing the coater layer.

(6) The optical information recording medium may be a single-sided recording medium obtained by laminating a single-side substrate and a non-grooved substrate with an adhesion. The single-sided optical recording medium being prepared by process (1) to (5).

(7) The optical information recording medium may be a double-sided recording medium obtained by laminating two single-sided optical recording medium with an adhesion. The single-sided optical recording medium being prepared by process (1) to (5).

DETAILED DESCRIPTION OF THE INVENTION

The invention will be further explained in detail for the following preferred embodiments.

Asymmetric dyes, which are trimethine-cyanine dyes substituted with different structure comprising electron-withdrawing group, could be synthesized by different methods suggested in *J. Org. Chem.* 1995, 60, 2411 and U.S. Pat. No. 6,306,478 (Scheme 1, 2, 3).

For example, the "EWG" is a nitro group, the "$R_3$" and "Y" are hydrogen group by the formula [1]. The formula [11] could not be obtained easily through scheme 1, because formula [10] is low reactivity and specific reactive condition needs to undergo in a sealed tube.

Scheme 1

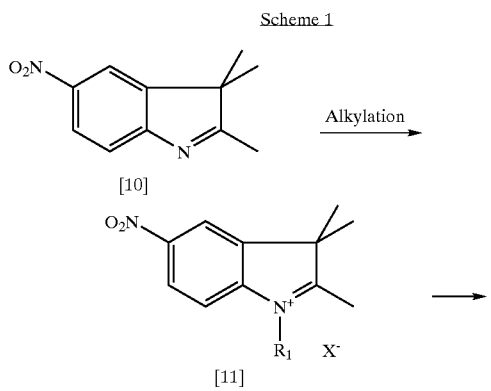

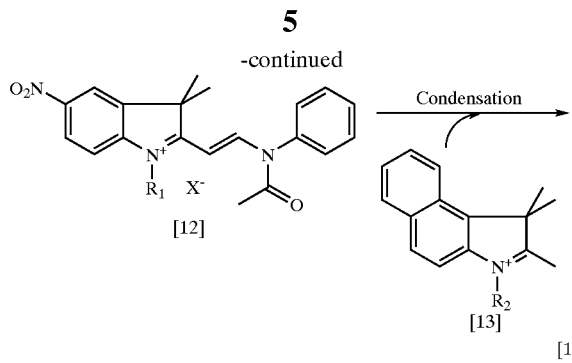

Even if formula [11] is obtained, the reaction will not undergo path 1 according to scheme 2. In stead, the reaction will follow path 2. And formula [13] is obtained at the refluxing condition with acetic anhydride solvent.

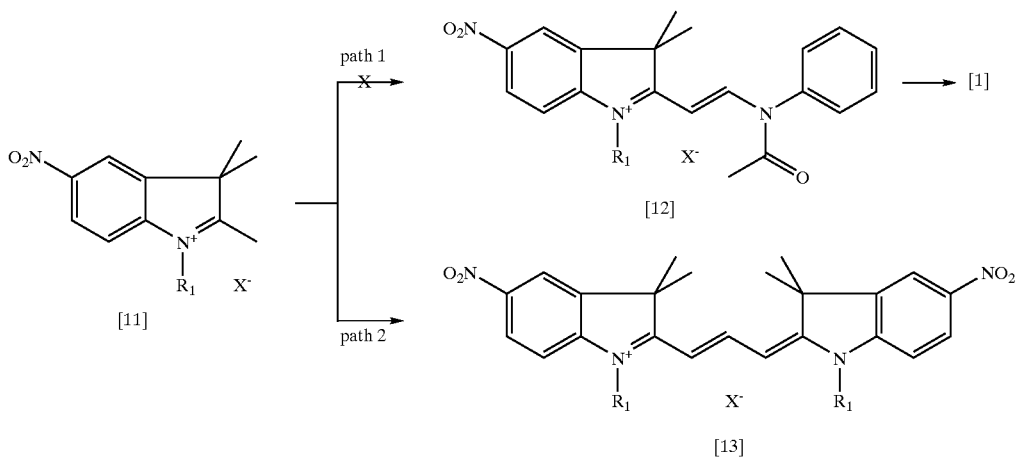

In scheme 3, the compound of formula [1] will be obtained but yield is low.

So we designed a modified method in scheme 4, the reactive condition is under atmosphere and formula [1] is obtained with high yield. From the following reaction figure of scheme 4, formula [15] and formula [11] could be obtained easily with high yield by using well know alkylation and nitration processes. Then, formula [11] is dissolved in alcohol solvent and is mixed with N,N-diphenylformamidine under refluxing. Next, formula [16] is obtained with ideal quality and yield. Finally, formula [16] and formula [13] are treated with basic solvent, stirred at room temperature, and formula [1] is obtained in high yield.

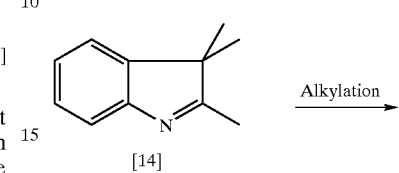

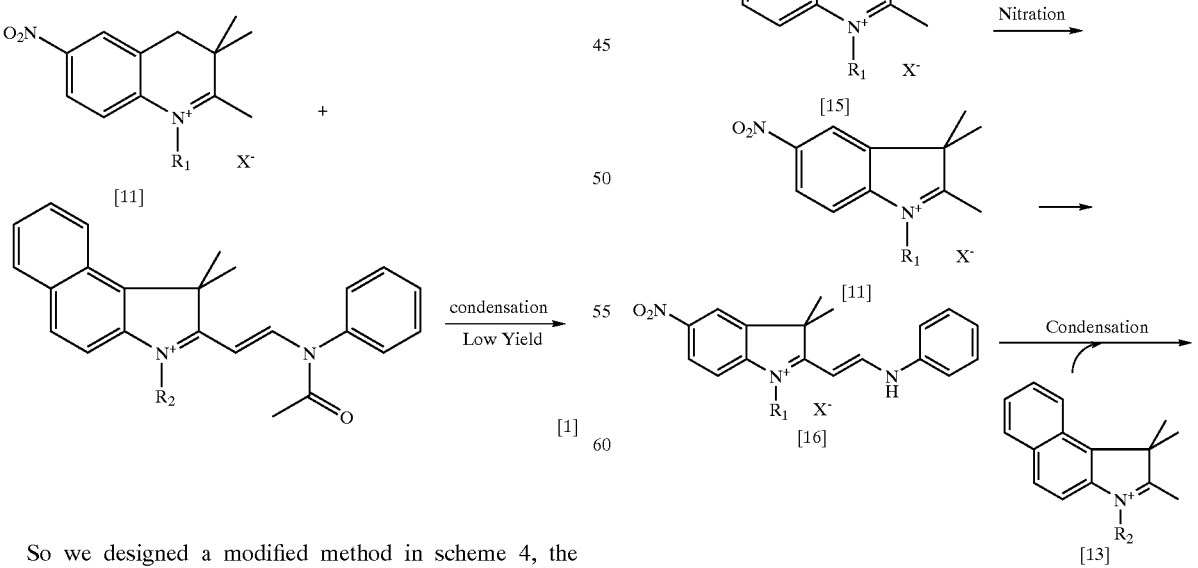

Examples of the compounds by the formula of [1], [2], [3], [4], which are synthesized by the similar method in scheme 4, are given below.

[1]

| Compound No | EWG | $R_1$ | $R_2$ | $R_3$ | X | Y |
|---|---|---|---|---|---|---|
| 1-1 | CN | $CH_3$ | $CH_3$ | H | $ClO_4$ | H |
| 1-2 | CN | $C_2H_5$ | $CH_3$ | H | $ClO_4$ | H |
| 1-3 | CN | $C_3H_7$ | $CH_3$ | H | $ClO_4$ | H |
| 1-4 | CN | $C_4H_9$ | $CH_3$ | H | $ClO_4$ | H |
| 1-5 | CN | $C_8H_{17}$ | $CH_3$ | H | $ClO_4$ | H |
| 1-6 | CN | $CH_3$ | $CH_3$ | H | $PF_6$ | H |
| 1-7 | CN | $C_2H_5$ | $CH_3$ | H | $PF_6$ | H |
| 1-8 | CN | $C_3H_7$ | $CH_3$ | H | $PF_6$ | H |
| 1-9 | CN | $C_4H_9$ | $CH_3$ | H | $PF_6$ | H |
| 1-10 | CN | $C_8H_{17}$ | $CH_3$ | H | $SbF_6$ | H |
| 1-11 | CN | $CH_3$ | $CH_3$ | H | $SbF_6$ | H |
| 1-12 | CN | $C_2H_5$ | $CH_3$ | H | $SbF_6$ | H |
| 1-13 | CN | $C_3H_7$ | $CH_3$ | H | $SbF_6$ | H |
| 1-14 | CN | $C_4H_9$ | $CH_3$ | H | $SbF_6$ | H |
| 1-15 | CN | $C_8H_{17}$ | $C_4H_9$ | H | $SbF_6$ | Me |
| 1-16 | CN | $C_8H_{17}$ | $C_4H_9$ | H | $SbF_6$ | Et |
| 1-17 | $NO_2$ | $CH_3$ | $CH_3$ | H | $ClO_4$ | H |
| 1-18 | $NO_2$ | $C_2H_5$ | $C_2H_5$ | H | $ClO_4$ | H |
| 1-19 | $NO_2$ | $C_3H_7$ | $C_4H_9$ | H | $ClO_4$ | H |
| 1-20 | $NO_2$ | $C_4H_9$ | $CH_3$ | H | $ClO_4$ | H |
| 1-21 | $NO_2$ | $C_3H_7$ | $C_4H_9$ | H | $PF_6$ | H |
| 1-22 | $NO_2$ | $C_3H_7$ | $C_4H_9$ | H | $SbF_6$ | H |
| 1-23 | $NO_2$ | $C_3H_7$ | $C_4H_9$ | H | $BF_4$ | H |
| 1-24 | $NO_2$ | $C_3H_7$ | $C_4H_9$ | H | $CH_3SO_3$ | H |

[2]

| Compound No | EWG | $R_1$ | $R_2$ | $R_3$ | X | Y |
|---|---|---|---|---|---|---|
| 2-1 | CN | $CH_3$ | $CH_3$ | H | $ClO_4$ | H |
| 2-2 | CN | $C_2H_5$ | $CH_3$ | H | $ClO_4$ | H |
| 2-3 | CN | $C_3H_7$ | $CH_3$ | H | $ClO_4$ | H |
| 2-4 | CN | $C_4H_9$ | $CH_3$ | H | $ClO_4$ | H |
| 2-5 | CN | $C_8H_{17}$ | $CH_3$ | H | $ClO_4$ | H |
| 2-6 | CN | $CH_3$ | $CH_3$ | H | $PF_6$ | H |
| 2-7 | CN | $C_2H_5$ | $CH_3$ | H | $PF_6$ | H |
| 2-8 | CN | $C_3H_7$ | $CH_3$ | H | $PF_6$ | H |
| 2-9 | CN | $C_4H_9$ | $CH_3$ | H | $PF_6$ | H |
| 2-10 | CN | $C_8H_{17}$ | $CH_3$ | H | $SbF_6$ | H |
| 2-11 | CN | $CH_3$ | $CH_3$ | H | $SbF_6$ | H |
| 2-12 | CN | $C_2H_5$ | $CH_3$ | H | $SbF_6$ | H |
| 2-13 | CN | $C_3H_7$ | $CH_3$ | H | $SbF_6$ | H |
| 2-14 | CN | $C_4H_9$ | $CH_3$ | H | $SbF_6$ | H |
| 2-15 | CN | $C_8H_{17}$ | $C_4H_9$ | H | $SbF_6$ | Et |
| 2-16 | CN | $C_8H_{17}$ | $C_4H_9$ | H | $SbF_6$ | Me |
| 2-17 | $NO_2$ | $CH_3$ | $CH_3$ | H | $ClO_4$ | H |
| 2-18 | $NO_2$ | $C_2H_5$ | $C_2H_5$ | H | $ClO_4$ | H |
| 2-19 | $NO_2$ | $C_3H_7$ | $C_4H_9$ | H | $ClO_4$ | H |
| 2-20 | $NO_2$ | $C_4H_9$ | $CH_3$ | H | $ClO_4$ | H |
| 2-21 | $NO_2$ | $C_3H_7$ | $C_4H_9$ | H | $PF_6$ | H |
| 2-22 | $NO_2$ | $C_3H_7$ | $C_4H_9$ | H | $SbF_6$ | H |
| 2-23 | $NO_2$ | $C_3H_7$ | $C_4H_9$ | H | $BF_4$ | H |
| 2-24 | $NO_2$ | $C_3H_7$ | $C_4H_9$ | H | $CH_3SO_3$ | H |

[3]

| Compound No | EWG | $R_1$ | $R_2$ | $R_4$ | X | Y |
|---|---|---|---|---|---|---|
| 3-1 | CN | $CH_3$ | $CH_3$ | H | $ClO_4$ | H |
| 3-2 | CN | $C_2H_5$ | $CH_3$ | H | $ClO_4$ | H |
| 3-3 | CN | $C_3H_7$ | $CH_3$ | H | $ClO_4$ | H |
| 3-4 | CN | $C_4H_9$ | $CH_3$ | H | $ClO_4$ | H |
| 3-5 | CN | $C_8H_{17}$ | $CH_3$ | H | $ClO_4$ | H |
| 3-6 | CN | $CH_3$ | $CH_3$ | H | $PF_6$ | H |
| 3-7 | CN | $C_2H_5$ | $CH_3$ | H | $PF_6$ | H |
| 3-8 | CN | $C_3H_7$ | $CH_3$ | H | $PF_6$ | H |
| 3-9 | CN | $C_4H_9$ | $CH_3$ | H | $PF_6$ | H |
| 3-10 | CN | $C_8H_{17}$ | $CH_3$ | H | $SbF_6$ | H |
| 3-11 | CN | $CH_3$ | $CH_3$ | H | $SbF_6$ | H |
| 3-12 | CN | $C_2H_5$ | $CH_3$ | H | $SbF_6$ | H |
| 3-13 | CN | $C_3H_7$ | $CH_3$ | H | $SbF_6$ | H |
| 3-14 | CN | $C_4H_9$ | $CH_3$ | H | $SbF_6$ | H |
| 3-15 | CN | $C_8H_{17}$ | $C_4H_9$ | H | $SbF_6$ | Et |
| 3-16 | CN | $C_8H_{17}$ | $C_4H_9$ | H | $SbF_6$ | Me |
| 3-17 | $NO_2$ | $CH_3$ | $CH_3$ | H | $ClO_4$ | H |
| 3-18 | $NO_2$ | $C_2H_5$ | $C_2H_5$ | H | $ClO_4$ | H |
| 3-19 | $NO_2$ | $C_3H_7$ | $C_4H_9$ | H | $ClO_4$ | H |
| 3-20 | $NO_2$ | $C_4H_9$ | $CH_3$ | H | $ClO_4$ | H |
| 3-21 | $NO_2$ | $C_3H_7$ | $C_4H_9$ | H | $PF_6$ | H |
| 3-22 | $NO_2$ | $C_3H_7$ | $C_4H_9$ | H | $SbF_6$ | H |
| 3-23 | $NO_2$ | $C_3H_7$ | $C_4H_9$ | H | $BF_4$ | H |
| 3-24 | $NO_2$ | $C_3H_7$ | $C_4H_9$ | H | $CH_3SO_3$ | H |

[4]

| Compound No | EWG | $R_1$ | $R_2$ | $R_4$ | X | Y |
|---|---|---|---|---|---|---|
| 4-1 | CN | $CH_3$ | $CH_3$ | H | $ClO_4$ | H |
| 4-2 | CN | $C_2H_5$ | $CH_3$ | H | $ClO_4$ | H |
| 4-3 | CN | $C_3H_7$ | $CH_3$ | H | $ClO_4$ | H |
| 4-4 | CN | $C_4H_9$ | $CH_3$ | H | $ClO_4$ | H |
| 4-5 | CN | $C_8H_{17}$ | $CH_3$ | H | $ClO_4$ | H |
| 4-6 | CN | $CH_3$ | $CH_3$ | H | $PF_6$ | H |
| 4-7 | CN | $C_2H_5$ | $CH_3$ | H | $PF_6$ | H |
| 4-8 | CN | $C_3H_7$ | $CH_3$ | H | $PF_6$ | H |
| 4-9 | CN | $C_4H_9$ | $CH_3$ | H | $PF_6$ | H |
| 4-10 | CN | $C_8H_{17}$ | $CH_3$ | H | $SbF_6$ | H |
| 4-11 | CN | $CH_3$ | $CH_3$ | H | $SbF_6$ | H |
| 4-12 | CN | $C_2H_5$ | $CH_3$ | H | $SbF_6$ | H |
| 4-13 | CN | $C_3H_7$ | $CH_3$ | H | $SbF_6$ | H |
| 4-14 | CN | $C_4H_9$ | $CH_3$ | H | $SbF_6$ | H |
| 4-15 | CN | $C_8H_{17}$ | $C_4H_9$ | H | $SbF_6$ | Me |
| 4-16 | CN | $C_8H_{17}$ | $C_4H_9$ | H | $SbF_6$ | Et |
| 4-17 | $NO_2$ | $CH_3$ | $CH_3$ | H | $ClO_4$ | H |
| 4-18 | $NO_2$ | $C_2H_5$ | $C_2H_5$ | H | $ClO_4$ | H |
| 4-19 | $NO_2$ | $C_3H_7$ | $C_4H_9$ | H | $ClO_4$ | H |
| 4-20 | $NO_2$ | $C_4H_9$ | $CH_3$ | H | $ClO_4$ | H |
| 4-21 | $NO_2$ | $C_3H_7$ | $C_4H_9$ | H | $PF_6$ | H |
| 4-22 | $NO_2$ | $C_3H_7$ | $C_4H_9$ | H | $SbF_6$ | H |

| 4-23 | NO$_2$ | C$_3$H$_7$ | C$_4$H$_9$ | H | BF$_4$ | H |
| 4-24 | NO$_2$ | C$_3$H$_7$ | C$_4$H$_9$ | H | CH$_3$SO$_3$ | H |

DVD-R Formation

A polycarbonate substrate is provided with a track pitch 0.74 μm and only wobble signal (pre-pit may also be included) is employed.

A solution contains trimethine-cyanine dyes of formula [1], [2], [3], [4] with 0.1% to 50% by weight or contains the mixture of trimethine-cyanine dyes of formula [1], [2], [3], [4] and one of formula [5], which is included less than 100% weight. The solution prepared above may further comprises some kind of singlet oxygen quencher such as a metal complex, a light absorbent, a radical scavenger, etc. The solvent used in the dye solution may be selected from fluorinated alcohol, diaceton alcohol, methylethyl ketone, methanol, toluene, cyclohexanone, acetylacetone, dioxane. Then, the substrate is spin-coated with the dye solution at a rotational frequency of 3000 rpm, and then is dried at 70° C. for 20 minutes to form a recording layer consisting of a photosensitive dye film with a thickness of 100 nm.

There after, a reflection layer of Au or Ag is deposited on the recording layer by sputtering. A protective layer comprising an ultraviolet-curing resin is further spin-coated on the reflection layer. Then a pair of the optical discs thus obtained is superimposed via an adhesive layer comprising an ultraviolet-curing resin, and thereby a laminated-disc is obtained.

Next, a laser beam of 650 nm or further is irradiated to the optical discs to form recording signals with improved characteristics, such as modulation amplitude, jitter and wide power margin.

This invention will be further explained in detail with reference to the following examples.

Dye Synthesis Process

Firstly, to synthesize N-propyl-2-(2-anilidovinyl)-3,3-dimethyl-5-nitroindolinium chlorate [16-1],

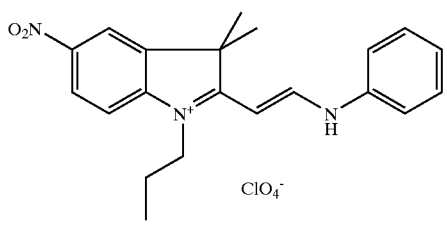

[16-1]

1-propyl-2,3,3-trimethyl-5-nitroindoleninum chlorate (23 g), N,N-diphenylformamidine (20 g) and 1-octanol (70 mL) are mixed in a 500 mL round bottle with a condenser. The mixture is refluxed for 24 hr. The formula [16-1] (15 g) is obtained as a orange brown color crystal while the room temperature is reached. The result is: $^1$H NMR (300 MHz, DMSO-d6) δ 1.04 (t, J=7.4 Hz, 3H), 1.85 (s, 6H), 4.15 (t, J=7.4 Hz, 2H), 6.30 (d, J=12.1 Hz, 1H), 7.40 (t, J=7.2 Hz, 1H), 7.53–7.66 (m, 4H), 7.79 (d, J=8.85 Hz, 1H), 8.40 (dd, J=12.1, 2.3 Hz, 1H), 8.68 (d, J=2.3 Hz, 1H) and 8.88 (d, J=12.1 Hz, 1H).

Secondly, the compound of formula [16-1] (12 g), 1-butyl-2,3,3-trimethylbenzo(e) indoleninum chlorate (9 g) and Pyridine (20 mL) are mixed by stirring at room temperature for 3 hr. Then, the solution is poured into 10% H$_2$SO$_4$ solution. The formula [1-19] (15 g) is obtained by filtering and crystallizing with MeOH. The spectrum result is λmax (CH$_3$CN)=577 nm; $^1$H NMR (300 MHz, CDCl$_3$) δ 0.99 (t, J=7.2 Hz, 3H), 1.06 (t, J=7.2 Hz, 3H), 1.53–1.61 (m, 4H), 1.78 (s, 6H), 1.92 (quint., J=7.2 Hz, 3H), 2.03 (s, 6H), 4.10 (t, J=7.2 Hz, 3H), 4.42 (t, J=7.2 Hz, 3H), 6.89 (d, J=13.5 Hz, 1H), 7.07 (d, J=8.8 Hz, 1H), 7.13 (d, J=13.5 Hz, 1H), 7.47 (d, J=8.8 Hz, 1H), 7.54 (t, J=7.6 Hz, 1H), 7.66 (t, J=7.6 Hz, 1H), 7.97–8.02 (m, 1H), 8.13 (d, J=8.6 Hz, 1H), 8.16 (d, J=2.1 Hz, 1H), 8.29 (dd, J=8.6, 2.1 Hz, 1H), 8.51 (t, J=13.5 Hz, 1H).

Disc Test Example 1

There are five experiments of Example 1,2,3 and Comparative 1,2 in Table 1. They will be described in detail as follows.

TABLE 1

| Example | UV Spectrum (nm) (CH$_3$CN) | Write (650 nm) | Reflectance % | Push-Pull % | I14/I14H | Jitter % |
|---|---|---|---|---|---|---|
| 1 | 577 | OK | 66.4 | 0.29 | 0.45 | 8.2 |
| 2 | 577 | OK | 55.3 | 0.60 | 0.60 | 5.7 |
| 3 | 577 | OK | 47.5 | 0.43 | 0.61 | 6.5 |
| Comparative 1 | 566 | Not available | | | | |
| Comparative 2 | 568 | Not available | | | | |

EXAMPLE 1

A transparent substrate, which is a disc made of a polycarbonate resin and has a spiral pre-groove with track pitch 0.74 μm thereon, is provided. The outer diameter of the substrate is about 120 mm and the thickness is about 0.6 mm.

Then, compound [1-19] (5.0 g) is dissolved in 100 mL of TFP (2,2,3,3-tetrafluoro-1-propanol) by stirring for 5 hrs at room temperature. The resulting solution is filtered through PTFE (0.2 μm) membrane filter to prepare a dye solution.

Next, the substrate is spin-coated with the dye solution at a rotational frequency of 3000 rpm, and dried at 70° C. for 20 minutes to form a recording layer consisting of a photosensitive dye film with a film thickness of 100 nm.

Afterwards, Ag is sputtered on this recording layer to form a reflective layer with a thickness of 100 nm. Argon gas is used as the sputtering gas. The sputtering power is 1.5 kW and the sputtering pressure is 1.0*10$^{-2}$ Torr.

Furthermore, an ultraviolet-curing resin (No.575 made by Nippon Chemicals, Inc.) is dripped on the reflective film. Another substrate, which is molded in the same manner as mentioned above, is placed on the surface of the substrate with the ultraviolet-curing resin thereon. After the resin interposed between these two substrates is dispersed by spin-coating method, the ultraviolet-curing resin is cured by irradiating ultraviolet. An optical laminated-disc is obtained by forming adhesive region of 25 μm in thickness and 32 mm to 120 mm in diameter.

Finally, a recording is performed on this optical disc by the recording machine of DVD-R/RW A03, PIONEER. The machines of DVDT-R, DVD-R/RW TESTER, DVDT-R650 for general, EXPERT MAGNETICS Co., Ltd. are used to measure the reflectance, push-pull, jitter and modulation amplitude. The measurement results are shown in Table 1.

EXAMPLE 2

An optical recording disc is manufactured in the same manner as described in example 1, except the dye material is replaced by compound of formula [1-21]. The optical parameters of the recording layer are measured in the same manner as illustrated in example 1, and the results of measurements are also shown in Table 1. In this example, it could be seen that the reflectance, push-pull and modulated amplitude are high, but the jitter is low.

EXAMPLE 3

An optical recording disc is manufactured in the same manner as described in example 1, except the dye material is replaced by compound [1-22]. The optical parameters of the recording layer are measured in the same manner as illustrated in example 1, and measurement result are shown in Table 1.

COMPARATIVE EXAMPLE 1

An optical recording disc is manufactured in the same manner as described in example 1 except the dye material is replaced by the formula [17]. The optical parameters of the recording layer are measured in the same manner as illustrated in example 1, and the results of measurements are shown in Table 1.

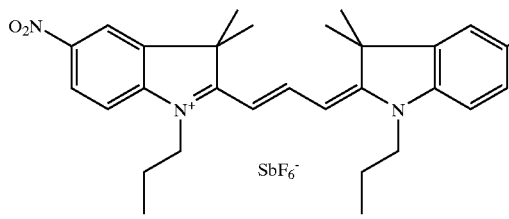

[17]

In this comparative example, the optical recording disc could not be available by using the DVD-R machine with the writing wavelength of 650 nm.

COMPARATIVE EXAMPLE 2

An optical recording disc is manufactured in the same manner as described in example 1, except the dye material is replaced by the formula [18]. The optical parameters of the recording layer are measured in the same manner as illustrated in example 1, and the results of measurements are shown in Table 1.

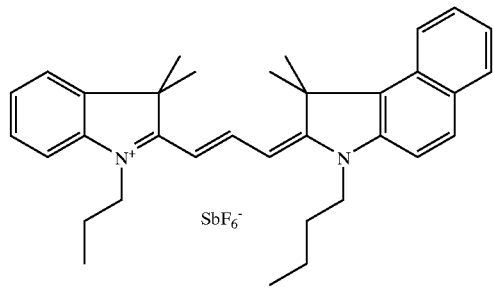

[18]

In this comparative example, the optical recording disc could not be available by using the DVD-R machine with the writing wavelength of 650 nm.

From the above description, the recording layer comprising only one kind of trimethine-cyanine dye with the asymmetric substituted structures of electron-withdrawing group (Example 1 to 3) is much more suitable than that comprising trimethine-cyanine dye with symmetrical structure (comparative example 1, 2), while the wavelength of laser beam 650 nm is used in the recorder.

Disc Test Example 2

There are seven experiments of Example 4, 5, 6, 7 and Comparative 3, 4, 5 in Table 2. There will be described in detail as follows.

TABLE 2

| Example | Write (650 nm) | Reflectance % | Push-Pull % | I14/I14H | Jitter % |
|---|---|---|---|---|---|
| 4 | OK | 57.6 | 0.34 | 0.6 | 7.4 |
| 5 | OK | 56.3 | 0.34 | 0.6 | 6.7 |
| 6 | OK | 64.9 | 0.30 | 0.58 | 7.5 |
| 7 | OK | 48.6 | 0.45 | 0.62 | 7.1 |
| Comparative 3 | Not available | | | | |
| Comparative 4 | Not available | | | | |
| Comparative 5 | Not available | | | | |

Example 4

First, a transparent substrate, which is a disc made of a polycarbonate resin and has a spiral pre-groove with track pitch 0.74 μm thereon, is provided. The outer diameter of the substrate is about 120 mm and the thickness is about 0.6 mm.

Compound 1-21 (3.0 g) and the compound of formula [19] (0.6 g) descended from the formula [5] are dissolved in TFP (2,2,3,3-tetrafluoro-1-propanol) (50 mL) by stirring for 5 hrs at room temperature. The resulting solution is filtered through PTFE (0.2 μm) membrane filter to prepare a dye solution.

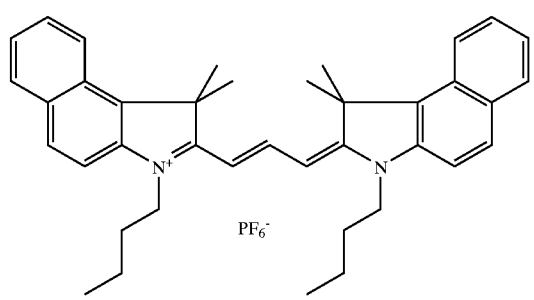

[19]

This substrate is spin-coated with the dye solution at a rotational frequency of 3000 rpm, and then dried at 70° C. for 20 minutes to form a recording layer comprising a photosensitive dye film with a film thickness of 100 nm.

Next, Ag is sputtered on this recording layer to form a reflective layer with a thickness of 100 nm. As a sputtering gas, an argon gas is used. The sputtering power is 1.5 kW and the sputtering pressure is $1.0*10^{-2}$ Torr.

Furthermore, an ultraviolet-curing resin (No.575 made by Nippon Chemicals, Inc.) is dripped on the reflective film. Another substrate, which is molded in the same manner as mentioned above, is placed on the surface of the substrate with the ultraviolet-curing resin thereon. After the resin interposed between these two substrates is dispersed by spin-coating method, the ultraviolet-curing resin is cured by irradiating ultraviolet rays. Thereby, an adhesive region of 25 μm in thickness and 32 mm to 120 mm in diameter are formed, and a laminated-disc type optical disc is obtained.

Finally, a recording is performed on this optical disc by a recording machine of DVD-R/RW A03, PIONEER. The machines of DVDT-R, DVD-R/RW TESTER, DVDT-R650 for general, EXPERT MAGNETICS Co., Ltd. are used to measure the reflectance, push-pull, jitter and modulation amplitude. The results of measurements are shown in Table 2.

EXAMPLE 5

An optical recording disc is manufactured in the same manner as described in example 4, however the dye material is replaced by the mixture of compound [1-22] (2.0 g) and the formula [19] (0.4 g) descended from the general formula [5]. The optical parameters of the recording layer are measured in the same manner as illustrated in example 4, and the results of measurements are shown in Table 2.

EXAMPLE 6

An optical recording disc is manufactured in the same manner as described in example 4, except the dye material is replaced by the mixture of compound [1-23] (2.0 g) and the formula [19] (0.9 g) descended from the general formula [5]. The optical parameters of the recording layer are measured in the same manner as illustrated in example 4, the results of measurements are shown in Table 2.

EXAMPLE 7

An optical recording disc is manufactured in the same manner as described in example 4, except the dye material is replaced by the mixture of compound [1-16] (2.0 g) and the formula [19] (0.2 g) descended from the general formula [5]. The optical parameters of the recording layer are measured in the same manner as illustrated in example 4, and the results of measurements are shown in Table 2.

COMPARATIVE EXAMPLE 3

An optical recording disc is manufactured in the same manner as described in example 4, except the dye material is replaced by the mixture of formula [20] (2.0 g) and the formula [19] (0.2 g) descended from the general formula [5]. The optical parameters of the recording layer are measured in the same manner as illustrated in example 4, and the results of measurements are shown in Table 2.

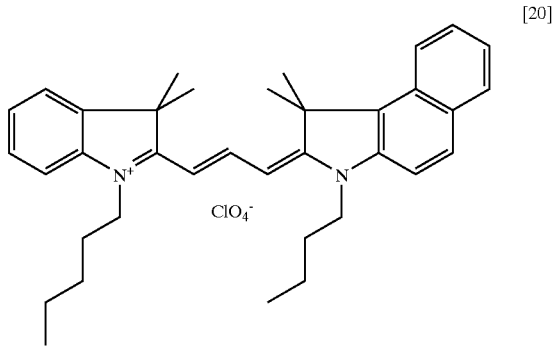

In this comparative example, the data could not be recorded on the disc by using the DVD-R machine with the writing wavelength of 650 nm. But it is performed well while the writing wavelength is 635 nm.

COMPARATIVE EXAMPLE 4

An optical recording disc is manufactured in the same manner as described in example 4, except that dye material is replaced with the mixture of formula [21] (2.0 g) and formula [19] (0.2 g) descended from formula [5]. The optical parameters of the recording layer are measured in the same manner as illustrated in example 4, and the results of measurements are shown in Table 2.

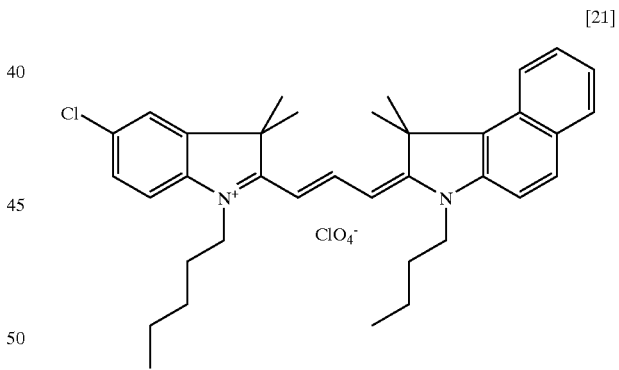

In this comparative example, the recording can't be performed well by using the DVD-R machine with the writing wavelength of 650 nm.

COMPARATIVE EXAMPLE 5

An optical recording disc is manufactured in the same manner as described in example 4, except that dye material is replaced with the mixture of formula [22] (2.0 g) and formula [19] (0.2 g) descended from formula [5] are used. The optical parameters of the recording layer are measured in the same manner as illustrated in example 4, and the results of measurements are shown in Table 2.

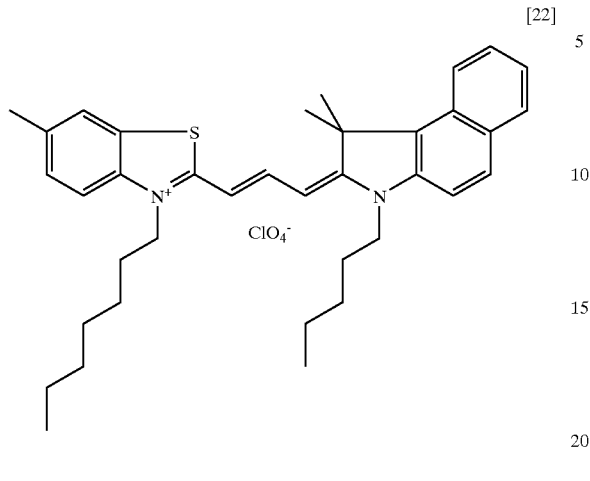

In this comparative example, the recording could not be performed well by using the DVD-R machine with the writing wavelength of 650 nm.

From the above description, the results of Example 4 to Example 7 are satisfied, while the wavelength of laser beam 650 nm is used in the recorder. In Example 4 to Example 7, the recording layer comprising two kinds of trimethine-cyanine dye, and one of the dye materials should be the asymmetric substituted structures of electron-withdrawing group. If the dye materials with the asymmetric substituted structures of electron-withdrawing group is changed to the trimethine-cyanine dyes with substituted group other than the asymmetric substituted structures of electron-withdrawing group, like hydrogen of comparative example 4, chlorine of comparative example 5 and methyl group of comparative example 6, the recording results will be failed for the corresponding discs.

Therefore, using the trimethine-cyanine dye material with the asymmetric substituted structure of electron-withdrawing group gets high push-pull, low jitter, large modulated amplitude and high reflectance. If the jitter value is low, the heat on the optical disc will be accumulated uneasily. And the large modulated amplitude combined with low jitter intends that the sensitivity of reproducing is good. It is apparently that the dye material with the asymmetric substituted structure of electron-withdrawing group improves the recording properties a lot, while the 635 nm laser wavelength is used during the recording process.

Once given the above disclosure, many other features, modifications, and improvement will become apparent to the skilled artisan. Such other features, modifications, and improvements are, therefore, considered to be a part of this invention, the scope of which is to be determined by the following claims.

What is claimed is:

1. An optical information recording medium provided on a substrate with a recording layer, said recording layer contains at least one kind of trimethine-cyanine dye, wherein said trimethine-cyanine dye can be represented by the following general formula [1], [2], [3], [4];

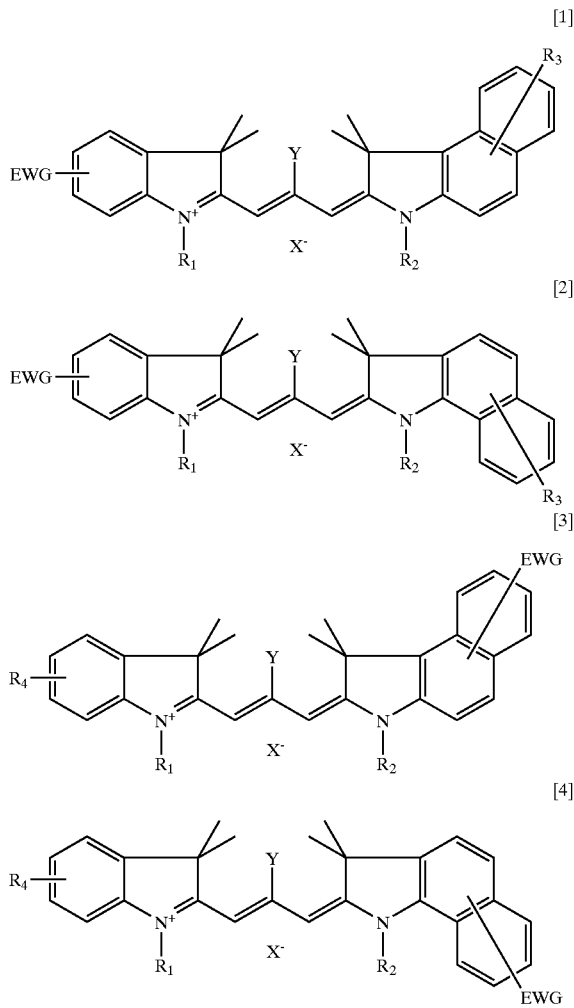

wherein said "EWG" represents any electron-withdrawing substituted group;

wherein said "$R_1$" and "$R_2$" may be the same or different from each other and each is one of an individually substituted or unsubstituted alkyl, phenyl, benzyl, alkylphenyl and a phenoxyalkyl group;

wherein said "$R_3$" and "$R_4$" may be the same or different from each other and each is one of a hydrogen atom, halogen atom, alkoxy, hydroxyl, and an alkyl group;

wherein said "Y" is one of a halogen atom and an alkyl group;

wherein said "$X^-$" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate, and akylcarboxylate; and wherein said trimethine-cyanine dye has a maximum absorption wavelength in the range of 575 nm to 590 nm in acetonitrile solution.

2. The optical information recording medium of claim 1, wherein said EWG is a nitro group.

3. The optical information recording medium of claim 1, wherein said EWG is a cyano group.

4. The optical information recording medium of claim 1, wherein said recording layer selectively contains the dye represented by the following general formula [5],

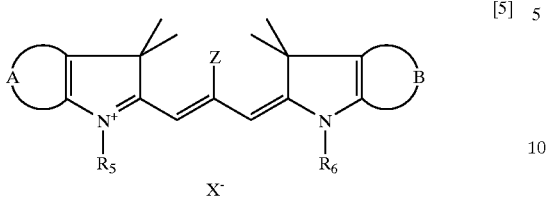
[5]

wherein said "A" and "B" may be the same or different from each other and represent any one of the formulas [6], [7], [8], [9];

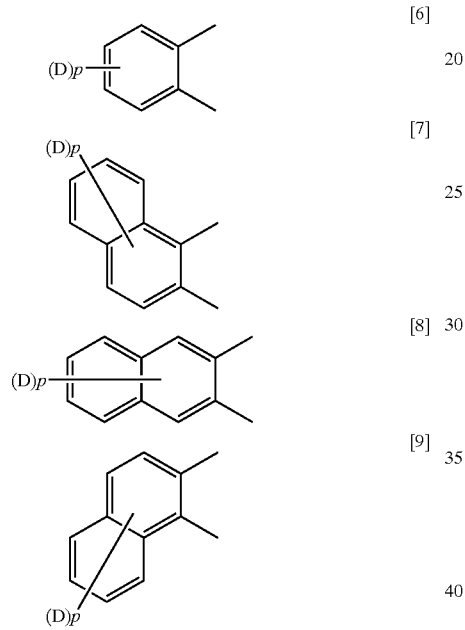

wherein said "D" may be substituted or unsubstituted alkyl, carboxyl, alkoxycarbonyl, alkylcarboxyl, alkoxyl, alklhydroxyl, aralkyl, alkenyl, alkylamide, alkylamino, alkylsufonamide, alkylcarbamoyl, alkylsulfamoyl, hydroxyl, halogen atom, hydrogen atom, alkylalkoxyl, alkylhalide, alkylsulfonyl, alkylcarboxyl or alkylsulfonyl which are bonded to a metallic ion or alkyl, phenyl, benzyl, alkylphenyl or phenoxyalkyl group;

wherein said "p" represents an integral;

wherein said "$R_5$" and "$R_6$" may be the same or different from each other and are individually substituted or unsubstituted alkyl, phenyl, benzyl, alkylphenyl or phenoxyalkyl group;

wherein said "Z" is hydrogen atom, halogen atom or alkyl group; and wherein said "$X^-$" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate, and akylcarboxylate.

5. An optical information recording medium provided on a substrate with a recording layer, said recording layer contains at least one kind of trimethine-cyanine dye, wherein said trimethine-cyanine dye can be represented by the following general formula [5]

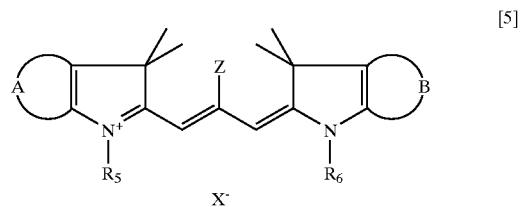
[5]

wherein said "A" and "B" may be the same or different from each other and represent any one of the formulas [6], [7], [8], [9];

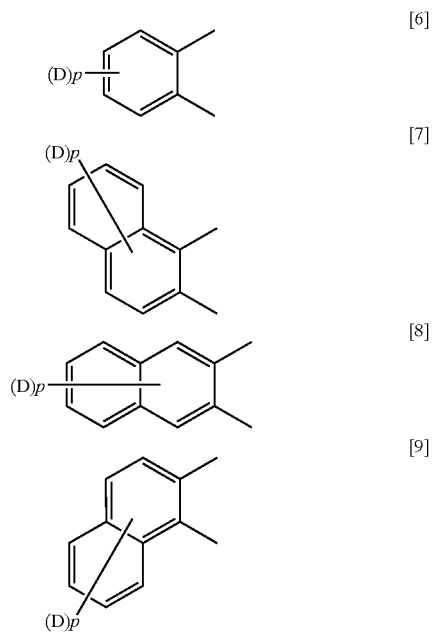

wherein said "D" may be alkylalkoxyl, alkylhalide, alkylcarboxyl or alkylsulfonyl which are bonded to a metallic ion or alkyl, phenyl, benzyl, alkylphenyl or phenoxyalkyl group;

wherein said "p" represents an integral;

wherein said "$R_5$" and "$R_6$" may be the same or different from each other and are individually substituted or unsubstituted alkyl, phenyl, benzyl, alkylphenyl or phenoxyalkyl group;

wherein said "Z" is a hydrogen atom, halogen atom or alkyl group; and wherein said "$X^-$" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and akylcarboxylate.

6. The optical information recording medium of claim 5, wherein said recording layer selectively contains the dye represented by the following general formula [1], [2], [3], [4];

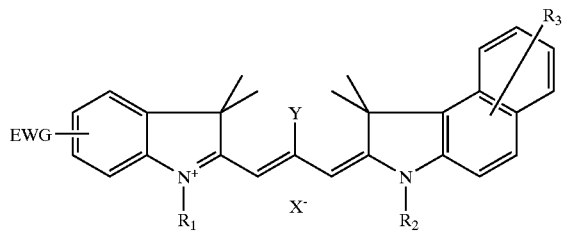

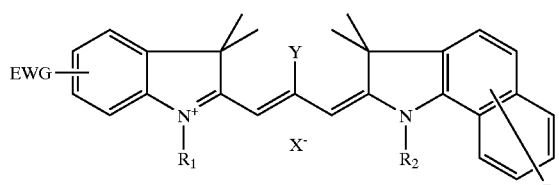

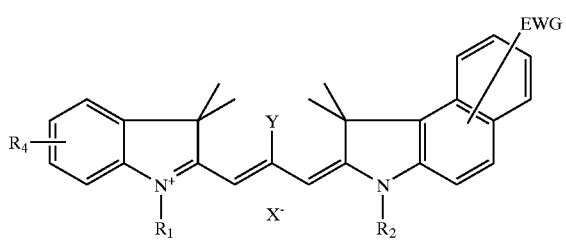

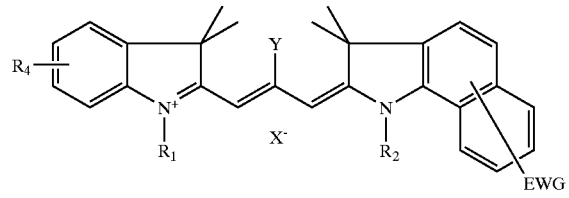

wherein said "EWG" represents any electron-withdrawing substituted group;

wherein said "$R_1$" and "$R_2$" may be the same or different from each other and are individually substituted or unsubstituted alkyl, phenyl, benzyl, alkylphenyl or phenoxyalkyl group;

wherein said "$R_3$" and "$R_4$" may be the same or different from each other and are hydrogen atom, halogen atom, alkoxy, hydroxyl, alkyl group;

wherein said "Y" may be hydrogen atom, halogen atom or alkyl group; and wherein said "$X^-$" is an anion selected from the group consisting of $F^-$, $Cl^-$, $Br^-$, $I^-$, $ClO_4^-$, $BF_4^-$, $PF_6^-$, $SbF_6^-$, $OTs^-$, $OMs^-$, $SCN^-$, alkylsulfonate and akyl-carboxylate.

7. The optical information recording medium of claim 6, wherein said EWG is a nitro group.

8. The optical information recording medium of claim 6, wherein said EWG is a cyano group.

* * * * *